UNITED STATES PATENT OFFICE.

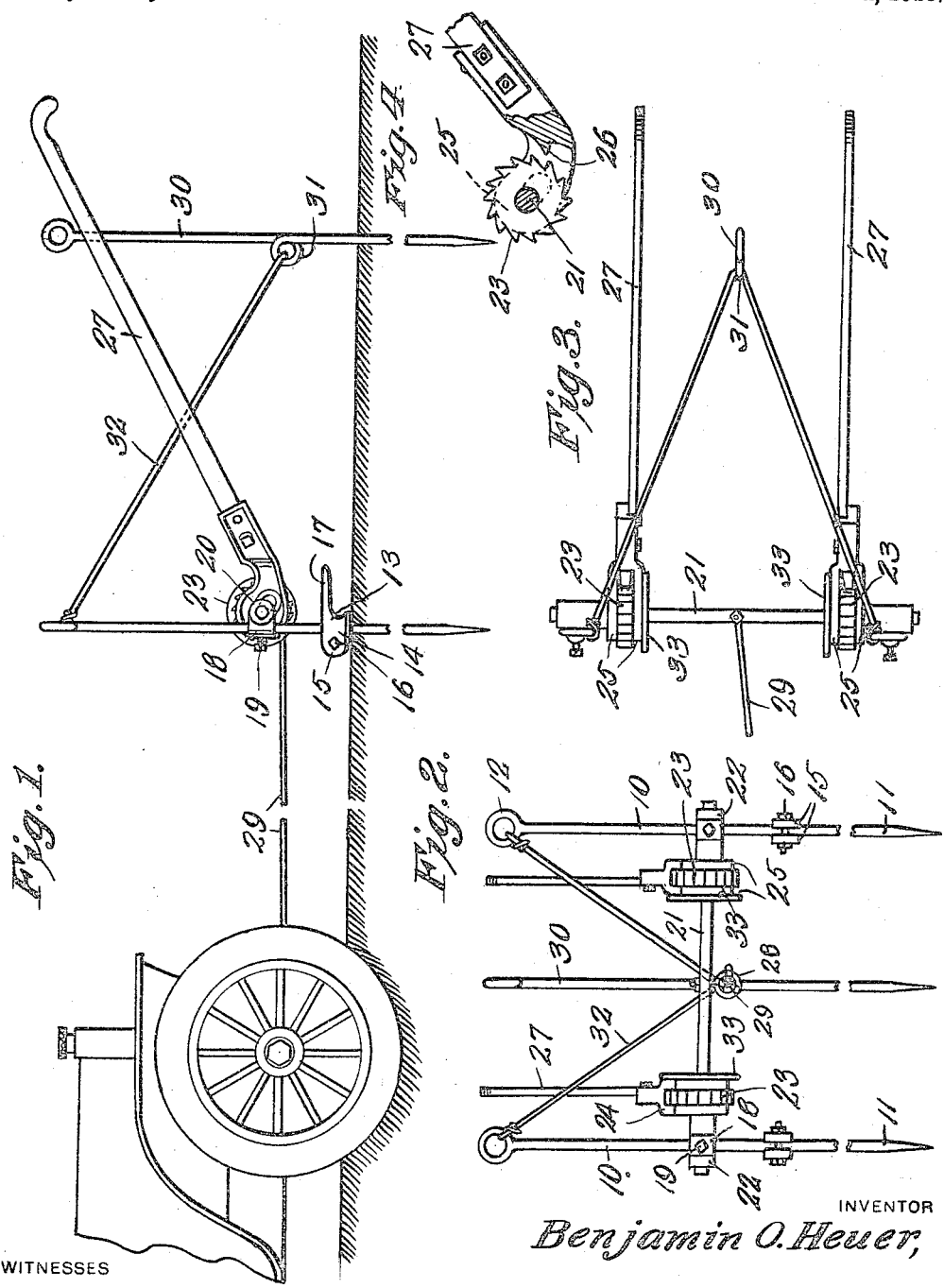

BENJAMIN O. HEUER, OF DONNELLY, MINNESOTA.

AUTOMOBILE-PULLER.

1,268,572.

Specification of Letters Patent.  Patented June 4, 1918.

Application filed November 24, 1917.  Serial No. 203,743.

*To all whom it may concern:*

Be it known that I, BENJAMIN O. HEUER, a citizen of the United States, residing at Donnelly, in the county of Stevens and State of Minnesota, have invented certain new and useful Improvements in Automobile-Pullers, of which the following is a specification.

This invention has relation to hoisting and pulling devices with special reference to devices for raising automobiles which have become lodged in holes in a road, and has for an object to provide a device of this character which is capable of exerting a powerful effort with a minimum application of power thereto by the operator.

Another object of the invention is to provide a device of the character above set forth which may be readily anchored in the earth and which embodies a shaft around which a cable is passed for connection to the automobile, and levers oscillatably mounted to rotate the shaft for the purpose set forth.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:

Figure 1, is a view in side elevation of the parts of my pulling device in operative relation and in the act of extricating an automobile from an opening in the road bed.

Fig. 2, is a view of the device *per se* in front elevation, and

Fig. 3, is a view thereof in plan.

Fig. 4, is a detail view in section of one of the ratchet wheels and rotating mechanism therefor.

Before proceeding with a description of my invention, it will be understood that while the device is intended primarily for use in extricating automobiles from ditches, holes in the road bed or the like, it will be presently obvious that the device may be utilized to hoist or pull heavy loads and for many other purposes.

With reference to the drawings, 10 indicates a pair of stakes, pointed at their lower ends as at 11 whereby they may be driven into the earth, and having eyes 12 at their opposite or upper ends. In order to facilitate the driving of the stakes into the earth, a cleat 13 is provided upon each stake in the form of a sleeve 14, split at one side and provided with apertured ears 15 which are penetrated by means of a bolt 16 whereby the sleeve may be clamped upon the stake. Extending oppositely to the ears 15 is an extension 17 having its upper face serrated whereby it may be engaged by the foot and the stake thus pressed into the ground.

The stakes are driven into the earth in spaced relation in transverse alinement to the proposed direction of travel of the vehicle, and slidably mounted upon each stake is a collar 18 held in vertically adjusted position by means of a set screw 19 which penetrates the collar and engages the stake. The collars 18 are disposed in horizontal alinement and each collar is formed with a bearing 20 having a horizontal aperture, said bearings receiving the ends of a horizontal shaft 21. Collars 22 may be applied to the extremities of the shaft outside of the bearings. Fixedly mounted upon the shaft 21 is a pair of ratchet wheels 23 which are located adjacent stakes 10, and a pair of bifurcated castings 24 are provided, the face members 25 of which engage opposite sides of the ratchet wheels 23 said members 25 being apertured whereby to receive the shaft 21. The apertures in the members 25 are elongated slightly so as to permit transverse movement of the bifurcated members 24 relative to the shaft. Within the bight portion of each casting 24 there is provided a lug 26 designed to serve as a pawl and to engage the ratchet 23 when the casting is moved transversely of the shaft for that purpose. A bar 27 is secured to each of said castings 24 to serve as a lever whereby the castings may be oscillated. The shaft 21 is furthermore provided centrally with an eye-bolt 28 which penetrates the shaft, a nut 29 being applied to the projecting extremity thereof whereby one end of a cable 29 may be passed through said eye and secured thereto.

A third stake indicated at 30 is provided, and is designed to be driven into the earth between the stakes 10 and at one side thereof and at the sides of said stakes 10 opposite that side facing the automobile. The stake 30 is formed at a point substantially intermediate its ends with a loop 31, and a cable 32 is secured at its ends to the eyes 12 of the stakes 10 and at its intermediate portion is passed through the loop 31 thereby bracing the stakes 10 in a direction opposite the direction of pull.

In use, the parts of the apparatus are set up in the manner described above and illustrated in the accompanying drawings, and one end of the cable 29 is secured to one of the axles of the automobile and the other end passed around the shaft 21 in the manner described above. By oscillating the levers 27, and manipulating the same so as to engage the pawl 26 against the ratchet wheels 23 at each movement of the lever in one direction, the shaft 21 may be rotated intermittently the cable will be wound about the shaft and the automobile thus extricated. A pair of disks 33, apertured to receive the shaft 21 may be provided to prevent the rope from winding upon the castings 24 and becoming entangled.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention and scope of the appended claim.

Having thus described my invention, what I claim as new and desire to secure by Letters Patent is:—

In a device of the character described, a pair of stakes in the form of rods adapted to be driven perpendicularly into the ground, having eyes formed upon their upper ends, a third stake in the form of a rod adapted to be driven perpendicularly into the ground at a point between and in advance of the pair of stakes, an eye formed at an intermediate part of the second stake, a cable passed through the eye and having its ends connected to the eyes of the pair of stakes, a collar slidably mounted on each one of said pair of stakes, a set screw in each collar to engage the stakes, and a bearing member on each collar to support a horizontal shaft, said collars being adjustable vertically on the stakes whereby when strain is applied to the shaft it may be taken up by the pairs of stakes at a point between the ground and the point of connection of the stakes with the cable offering the greatest resistance.

In testimony whereof I affix my signature in presence of two witnesses.

BENJAMIN O. HEUER.

Witnesses:
O. O. STEENFORT,
J. C. BETZLAFF.

Copies of this patent may be obtained for five cents each, by addressing the "Commissioner of Patents, Washington, D. C."